No. 611,022.  Patented Sept. 20, 1898.
H. B. PERRY.
NUT LOCK.
(Application filed Dec. 11, 1897.)

(No Model.)

Witnesses
Nathan B. Lewis.
M. E. Cleveland

Inventor.
Howard B. Perry.
Arnold & Barlow
Attorneys

UNITED STATES PATENT OFFICE.

HOWARD B. PERRY, OF WAKEFIELD, RHODE ISLAND.

NUT-LOCK.

SPECIFICATION forming part of Letters Patent No. 611,022, dated September 20, 1898.

Application filed December 11, 1897. Serial No. 661,506. (No model.)

*To all whom it may concern:*

Be it known that I, HOWARD B. PERRY, of Wakefield, in the county of Washington and State of Rhode Island, have invented certain new and useful Improvements in Nut-Locks and Bolt-Tighteners; and I do hereby declare that the following is a full, clear, and exact description thereof, reference being had to the accompanying drawings, and to the letters of reference marked thereon, which form a part of this specification.

This invention is an improvement in nut-locks and bolt-tighteners for use on the bolts and fish-plates applied to the joints of the rails on railways to prevent the jar and working of the rails from the trains passing over them from causing the nuts to get loose and work off.

It is fully explained and illustrated in this specification and the accompanying drawings.

Figure 1:
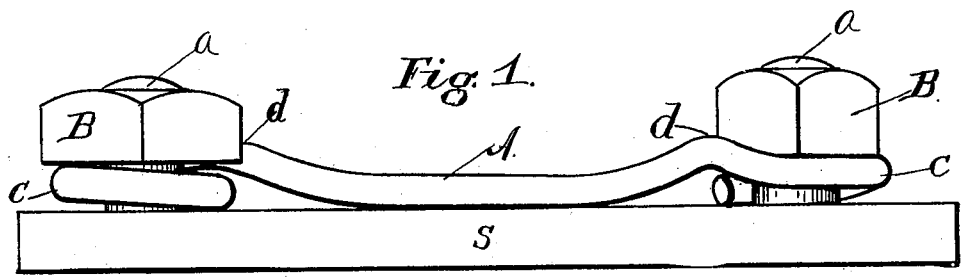
Figure 2:
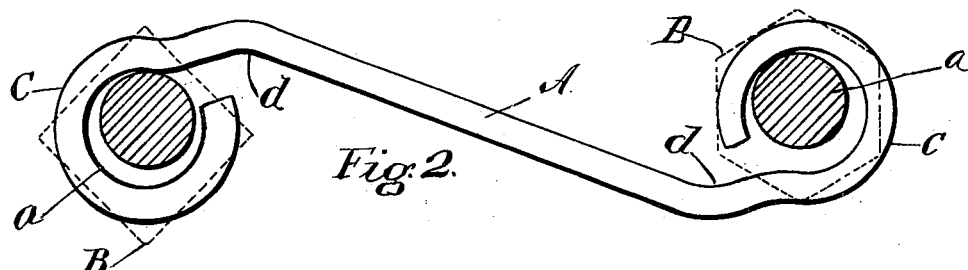
Figure 3:
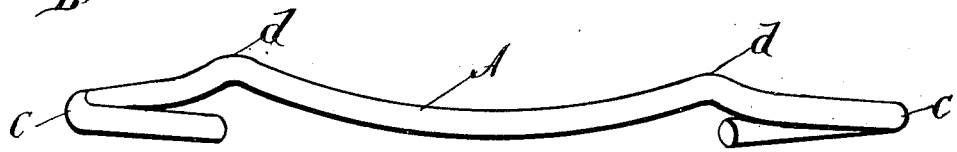
Figures 4, 5:
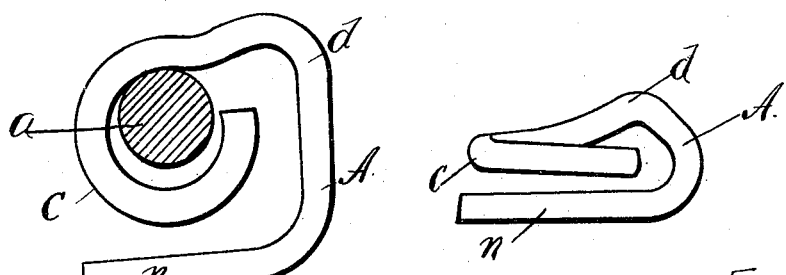

Figure 1 is a side view of a plate representing a fish-plate, showing the nut-lock applied as in use. Fig. 2 is a top view of the nut-lock with the two bolts in section. Fig. 3 represents an edge or side view of the nut-lock separate. Fig. 4 is a top view of the nut-lock intended for use on a single bolt, with a bolt in section. Fig. 5 is an edge or side view of Fig. 4.

The object of the invention is to produce a nut-lock and bolt-tightener that will better effect the preventing of the nut from working loose and at the same time allow it to be easily removed when desired. It consists of a short bar of metal A, preferably steel, on account of its resiliency. The ends of this bar are bent around in opposite directions to form loops $c\ c$, that nearly surround the bolts $a\ a$. These loops are made in the same plane, excepting that they have a slight helical form with the extreme ends the lowest when the nut-lock is in position seen in Fig. 3. These loops $c\ c$ are made at the proper distance apart to accommodate the bolts in the ends of two adjacent rails, and an outward turn and rise $d$ are made in the bar near each end about opposite to the extreme open ends of the loop $c$. (See Figs. 2 and 3.) From the top of the rise $d$ the bar returns laterally and gradually descends with less curve to the middle, forming a parabolic curve between the points $d\ d$, that rests on the plate S and holds the loops up to press on the under side of the nuts B B when they are screwed down and take up any looseness of the bolt produced by wearing in consequence of the working of the rails. It will readily be seen that the inclines outward and upward on the outer side of the point $d$, coming as they do so that the corners of the nuts sweep across them when the nuts are turned, will prevent the corners from passing them from any tendency of the nut to unscrew caused by the jar or working of the rails; but the spring in the bar will allow the incline of the rise to be depressed by the corners of the nut when turned with a wrench in screwing them on or off, as the case may be.

In Figs. 4 and 5 there are shown two views of the nut-lock arranged for a single bolt $a$. It is made by cutting one of the nut-locks, made for two bolts above described, in two and bending the cut end down in such shape as to make a leg $n$ to rest upon the lower flange of the rail and prevent the nut-lock from turning. In every other respect it is made exactly like one-half of the form shown in Fig. 2.

In the form as shown in Fig. 3 the middle may be bent down farther to obtain more spring under the nuts, if desired.

Having thus described my improved nut-lock, I claim as my invention and desire to secure by Letters Patent—

1. A nut-lock and bolt-tightener consisting of a metallic bar bent into loops at each end to nearly surround the bolts, and having an outward and upward bend made in the main bar about opposite each of the free ends of said loops, and the part of the bar between the rises made with a downward and inward return-bend, substantially as described.

2. A nut-lock and bolt-tightener consisting of a metallic bar bent into a loop at one end to nearly surround the bolt, and having an outward and upward bend made in the bar about opposite the free end of said loop, and the part of bar outside of said outward and upward bend, made with a downward and inward return-bend, with means for preventing said loop from turning, substantially as described.

In testimony whereof I have hereunto set my hand this 7th day of December, A. D. 1897.

HOWARD B. PERRY.

In presence of—
NATHAN B. LEWIS,
BENJ. ARNOLD.